(12) United States Patent
Horimai

(10) Patent No.: US 7,408,865 B2
(45) Date of Patent: Aug. 5, 2008

(54) OPTICAL INFORMATION RECORDING APPARATUS AND OPTICAL INFORMATION REPRODUCING APPARATUS USING HOLOGRAPHY

(75) Inventor: Hideyoshi Horimai, Yokohama (JP)

(73) Assignee: Optware Corporation, Kanagawa (JP)

( * ) Notice: Subject to any disclaimer, the term of this patent is extended or adjusted under 35 U.S.C. 154(b) by 643 days.

(21) Appl. No.: 10/886,281

(22) Filed: Jul. 7, 2004

(65) Prior Publication Data

US 2005/0030876 A1    Feb. 10, 2005

(30) Foreign Application Priority Data

Jul. 8, 2003    (JP)    ............................. 2003-193964

(51) Int. Cl.
 *G11B 7/0065*    (2006.01)
(52) U.S. Cl. .................................................... 369/103
(58) Field of Classification Search ........................ None
See application file for complete search history.

(56) References Cited

U.S. PATENT DOCUMENTS

| 4,700,336 | A | * | 10/1987 | Yoshida et al. ........... 369/44.35 |
| 5,940,514 | A | * | 8/1999 | Heanue et al. .............. 713/193 |
| 7,227,827 | B2 | * | 6/2007 | Horimai et al. ............. 369/103 |
| 2003/0021493 | A1 | * | 1/2003 | Nakaya et al. .............. 382/305 |
| 2003/0031112 | A1 | * | 2/2003 | Horimai ..................... 369/244 |
| 2003/0090969 | A1 | * | 5/2003 | Matsumoto et al. ...... 369/44.34 |
| 2003/0231573 | A1 | * | 12/2003 | Matsumoto et al. .... 369/112.29 |

FOREIGN PATENT DOCUMENTS

JP    61269243 A    * 11/1986

OTHER PUBLICATIONS

English translation of the Abstract of JP 61-269243.*

* cited by examiner

*Primary Examiner*—Andrea Wellington
*Assistant Examiner*—Michael V. Battaglia
(74) *Attorney, Agent, or Firm*—William L. Androlia; H. Henry Koda

(57) ABSTRACT

It is an object of the invention to record and reproduce information successfully even when light having small energy is used for hologram. A drive means to move a collimator lens according to movement of a recording medium is provided, and an angle of light for recording which enters from the collimator lens to a polarizing beam splitter is changed. In result, a position of light which enters the recording medium is shifted, and therefore, information can be recorded in a normal position of the recording medium, and information can be reproduced from the normal position on the recording medium according to movement of the recording medium.

10 Claims, 2 Drawing Sheets

OPTICAL INFORMATION RECORDING APPARATUS AND OPTICAL INFORMATION REPRODUCING APPARATUS USING HOLOGRAPHY

BACKGROUND OF THE INVENTION

1. Field of the Invention

The present invention relates to an optical information recording apparatus which records information in a recording medium in which information is recorded by utilizing holography, and an optical information reproducing apparatus which reproduces information in a recording medium in which information is recorded.

2. Description of the Related Art

Conventionally, holographic recording which records information in a recording medium by utilizing holography has been generally performed by overlapping inside the recording medium information light carrying image information and reference light for recording which construct light for recording, and writing a resultant interference pattern in the recording medium. When the recorded information is reproduced, the recording medium is illuminated with reference light for reproduction to cause diffraction attributable to the interference pattern which reproduces the image information (refer to Japanese Unexamined Patent Application Publication No. H11-311938).

Recently, volume holography, and more particularly, digital volume holography has been developed and is attracting attention in practical fields for super high density optical recording. The volume holography is a method of writing an interference pattern on the three dimensional basis by actively utilizing a recording medium even in its thickness direction, which is characterized in that diffraction efficiency is improved by increasing a thickness and in that an increased recording capacity can be achieved by utilizing multiplex recording. The digital volume holography is a computer oriented holographic recording method, in which image information to be recorded is limited to binary digital patterns while the recording medium and the recording method similar to of the volume holography are used. In this digital volume holography, for example, analog image information such as a picture is once digitized and developed into two dimensional digital pattern information, which is recorded as image information. When the information is reproduced, this digital pattern information is recorded and decoded to return to the original image information, which is to be displayed. Therefore, even when an SN ratio (signal-to-noise ratio) is somewhat poor when reproducing information, it is possible to recreate the original information very truly by performing differential detection and error correction on encoded binary data.

As a method of the holographic recording, a dominant method is a method to use an optical pickup apparatus comprising an optical system for performing information recording in the recording medium and information reproduction from the recording medium by adopting a disc-shaped recording medium similar to a CD (Compact Disc), a DVD (Digital Versatile Disc) and the like.

In general, in an optical disc apparatus, focus servo and tracking servo are performed by driving an objective lens in the optical pickup apparatus while rotating the disc-shaped recording medium.

In the optical disc apparatus, laser light is used as light for recording. When Q switch laser light is used as this laser light, information can be recorded in the recording medium in a short period of time even when the recording medium is rotating, since this Q switch laser light is laser light having large energy. Meanwhile, when semiconductor laser light is used as laser light, it is necessary to record information in the recording medium for a longer stretch of time than when the Q switch laser light is used, since this semiconductor laser light is laser light having small energy.

Therefore, when information is recorded in the recording medium by using the semiconductor laser light, it is necessary to change positions of illumination with the semiconductor laser light according to rotation of the recording medium.

As an example in which positions of illumination with the semiconductor laser light are changed as above, there is a case wherein an reflecting mirror arranged in an optical system to make laser light enter a recording medium is moved according to rotation of the recording medium (refer to International Publication No. 99/44195).

In the case that the reflecting mirror is moved according to rotation of the recording medium, which is described in the foregoing International Publication No. 99/44195, however, a drive means has to be connected to the reflecting mirror placed in the vicinity of the recording medium. Therefore, there is a risk that a weight of the optical system is increased, the reflecting mirror cannot be moved successfully, and therefore precision of information to be recorded in the recording medium becomes worse.

Such a phenomenon that the reflecting mirror cannot be moved according to rotation of the recording medium successfully might arise when information is reproduced from the recording medium.

SUMMARY OF THE INVENTION

It is an object of the invention to provide an optical information recording apparatus and an optical information reproducing device, which can overcome the foregoing conventional problems, and which can record and reproduce information successfully even when light having small energy is used for hologram.

In order to attain the foregoing object, an optical information recording apparatus of the invention according to claim 1 is characterized in that, in an optical information recording apparatus in which light for recording from a light source is changed into parallel light by a collimator lens, the parallel light enters a polarizing beam splitter comprising a half reflection mirror, and a recording medium in motion is illuminated with the light for recording to record information in the recording medium by utilizing holography, a drive means to move the collimator lens according to movement of the recording medium is provided, and an angle of the light for recording which enters the polarizing beam splitter from the collimator lens is changed. Since such a construction is adopted, information can be recorded in a normal position on the recording medium according to movement of the recording medium by shifting a position of the light entering the recording medium.

The optical information recording apparatus of the invention according to claim 2 is characterized in that the drive means moves the collimator lens in the same plane. Since such a construction is adopted, information can be recorded in the normal position on the recording medium according to movement of the recording medium only by simply moving the collimator lens in the same plane.

An optical information reproducing apparatus of the invention according to claim 3 is characterized in that, in an optical information reproducing apparatus in which reference light for reproduction from a light source is changed into parallel light by a collimator lens, the parallel light enters a polarizing beam splitter comprising a half reflection plane, and a recording medium in motion is illuminated with the reference light for reproduction to reproduce information of the recording medium by utilizing holography, a drive means to move the collimator lens according to movement of the recording medium is provided, and an angle of the reference light for reproduction which enters the polarizing beam splitter from the collimator lens is changed. Since such a construction is adopted, information can be reproduced from a normal position on the recording medium according to movement of the recording medium by shifting a position of the light entering the recording medium.

The optical information reproducing apparatus of the invention according to claim 4 is characterized in that the drive means moves the collimator lens in the same plane. Since such a construction is adopted, information can be reproduced from the normal position on the recording medium according to movement of the recording medium only by simply moving the collimator lens in the same plane.

DETAILED DESCRIPTION OF THE PREFERRED EMBODIMENT

Figure 1:
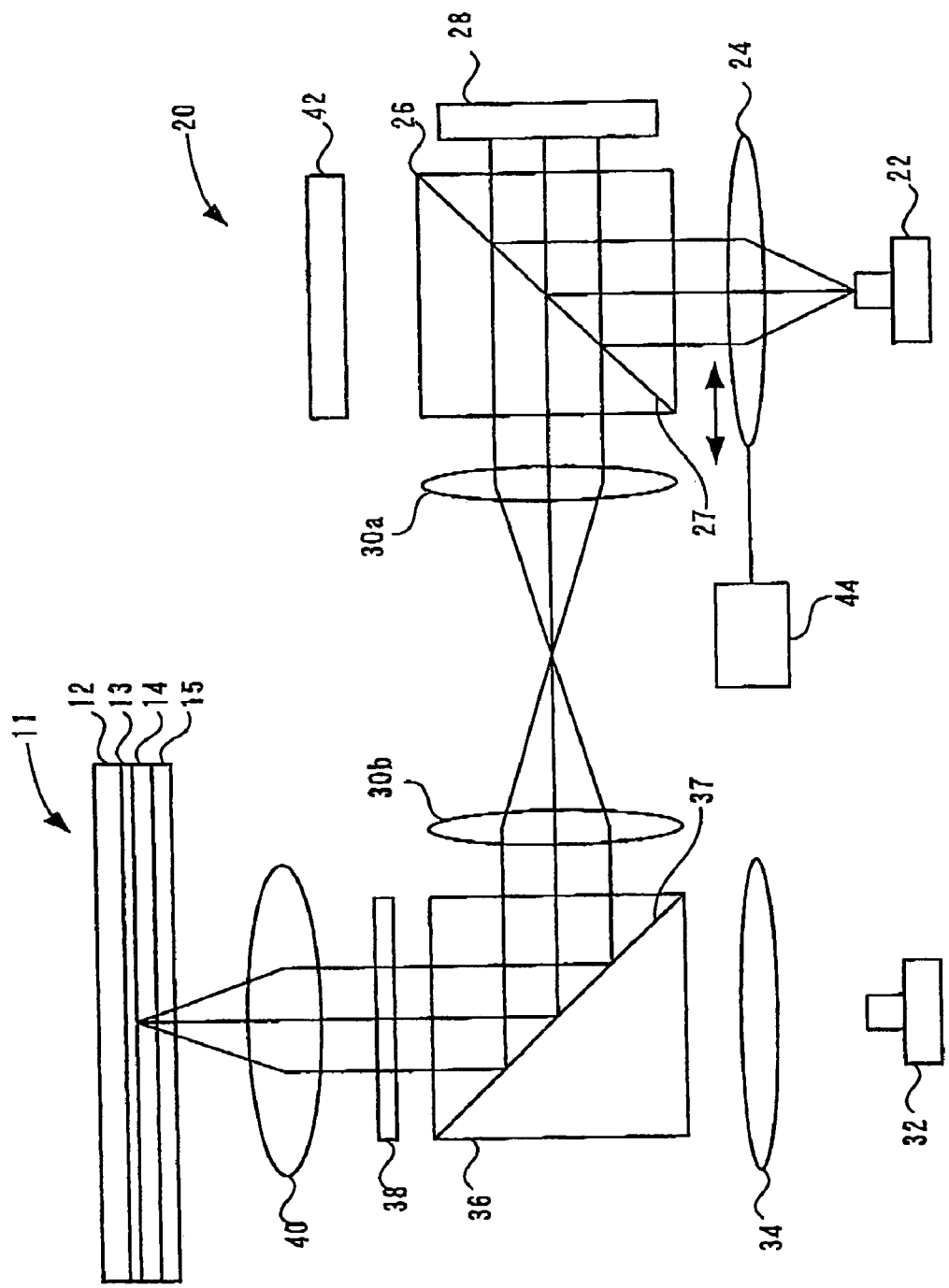
FIG. 1 is a construction drawing showing an embodiment of an optical information recording/reproducing apparatus which combines an optical information recording apparatus and an optical information reproducing apparatus according to the invention.

FIG. 1 shows an embodiment of an optical information recording/reproducing apparatus which combines an optical information recording apparatus and an optical information reproducing apparatus according to the invention.

A recording medium 11 in which information is recorded has a plate-shaped first transparent substrate 12. An information recording layer 13 is formed under this first transparent substrate 12. A reflection layer (not shown) is provided under this information recording layer 13 with a transparent intermediate layer 14 in between. The information recording layer 13, the intermediate layer 14, and the reflection layer (not shown) are sandwiched between a second transparent substrate 15 provided at the bottom end and the first transparent substrate 12. In the plate-shaped recording medium 11, a track (not shown) is formed concentrically or spirally.

An optical information recording apparatus 20 comprises a light source for recording and reproduction 22, a first collimator lens 24, a polarizing beam splitter 26, a spatial light modulator (information expressive means) 28, a pair of relay lenses 30a and 30b, a device for servo reading 32, a second collimator lens 34, a dichroic mirror 36, a one fourth wavelength plate 38, an objective lens 40, and a photodetector 42.

As the light source for recording and reproduction 22, a device which generates a bundle of rays of coherent linearly polarized light such as a semiconductor laser can be used. For this light source for recording and reproduction 22, short wave lengths are advantageous in order to perform high density recording. It is preferable to adopt a blue laser or a green laser.

The first collimator lens 24 changes the divergent bundle of rays from the light source for recording and reproduction 22 into approximately parallel rays. The polarizing beam splitter 26 has a half reflection plane 27, which reflects or lets through linearly polarized light (for example, P polarized light) generated from the light source for recording and reproduction 22, and which lets through or reflects linearly polarized light (for example, S polarized light) perpendicular to the polarized light in question.

The spatial light modulator (information expressive means) 28 has many pixels arranged in the shape of a grid. It is possible to select whether a polarization direction of exit light is rotated at an angle of 90° in relation to a polarization direction of incident light or not for each pixel. As this spatial light modulator 28, for example, a reflective liquid crystal display device utilizing optical rotation of liquid crystal wherein a polarizing plate on the entrance and exit side is omitted can be used. This spatial light modulator 28 constructs an information light generation means to generate information light which is part of light for recording, a reference light generation means to generate reference light which is part of the light for recording as well, and a reference light for reproduction generation means.

The pair of relay lenses 30a and 30b forms an image displayed at the spatial light modulator 28 as a real image again.

The device for servo reading 32 is intended to read embossed pit (not shown) of the reading medium 11. The device for servo reading 32 also comprises a light source to generate light for servo to read the embossed pit such as a semiconductor laser and a photodetector to receive laser light returned from the recording medium 11 through the embossed pit. This light source of the device for servo reading 32 has a wavelength different from of the light source for recording and reproduction 22. Further, as the light source of the device for servo reading 32, a light source which have no effect on the information recording layer 13 of the recording medium 11 is selected. As this light source of the device for servo reading 32, for example, an infrared laser can be used.

The second collimator lens 34 changes the light for servo from the device for servo reading 32 into approximately parallel rays. Further, the second collimator lens 34 makes the laser light returned from the recording medium 11 converge on the photodetector of the device for servo reading 32. The dichroic mirror 36 has a half reflection plane 37, which reflects or lets through light having the wavelength generated from the light source for recording and reproduction 22, and which lets through or reflects light having the wavelength generated from the device for servo reading 32.

The one fourth wavelength plate 38 is a phase plate which changes, by one fourth wavelength, a difference between light paths of polarized light which oscillates in the direction perpendicular to each other. P polarized light is changed into circular polarized light by this one fourth wavelength plate 40, and this circular polarized light is changed into S polarized light when the circular polarized light passes the one fourth wavelength plate 38.

The objective lens 40 makes light for recording and light for reproduction converge toward on the recording medium 11. A given position in the recording medium 11 is illuminated with the light for recording or the light for reproduction by the objective lens 40.

The photodetector 42 arranged in the vicinity of the polarizing beam splitter 26 receives reproduction light and reproduces recorded information. The photodetector 42 has many photo acceptance devices arranged in the shape of a grid. As a photo acceptance device, a CCD array which adopts a CCD (Charge Coupled Device), a CMOS sensor which adopts a CMOS (Complementary Metal-Oxide Semiconductor) and the like can be used.

In this embodiment, in particular, a drive means 44 such as a linear motor is connected to the first collimator lens 24. This drive means 44 moves the first collimator lens 24 which changes the bundle of rays exiting from the light source for recording and reproduction 22 into the parallel rays from side to side in the plane of the first collimator lens 24. This drive means 44 drives the first collimator lens 24 correspondingly to position information of the recording medium 11 which is detected by the photodetector of the device for servo reading 32.

Next, descriptions will be given of light paths of the light for recording when information is recorded.

First, a bundle of rays exiting from the light source for recording and reproduction 22 is changed into a bundle of approximately parallel rays by the collimator lens 24. The bundle of parallel rays is reflected by the half reflection plate 27 of the polarizing beam splitter 26, and enters the spatial light modulator 28.

This spatial light modulator 28 selects whether a polarization direction is rotated at an angle of 90° or not every pixel, and displays a modulation pattern. The incident light thereby can carry a given information. Information light and reference light for recording can be concurrently generated, by displaying an information pattern desired to be recorded in the center of a display pattern, and displaying a circular pattern to generate the reference light for recording around the information pattern.

The resultant light for recording comprising the information light and the reference light for recording passes the polarizing beam splitter 26, and the pair of relay lenses 30a and 30b; is reflected by the half reflection plane 37 of the dichroic mirror 36; proceeds in the direction of the objective lens 40; and is changed from linearly polarized light to circularly polarized light at the one fourth wavelength plate 38. The recording medium 11 is illuminated with the resultant circularly polarized light by the objective lens 40. In the recording medium 11, the information light of the light for recording interferes with the reference light for recording of the light for recording. An interference pattern thereof is recorded in the information recording layer 13.

Behavior of light for reproduction when information is reproduced, is basically the same as the foregoing behavior of the light for recording when information is recorded. In reproduction, however, a pattern to generate reference light for reproduction is displayed as a modulation pattern displayed on the spatial light modulator 28, and therefore, the reference light for reproduction is to be generated as the light for reproduction. When the recording medium 11 is illuminated with the reference light for reproduction which is the light for reproduction, the reference light for reproduction which is the light for reproduction is diffracted by the interference pattern recorded in the information recording layer 13, and reproduction light carrying information of the interference pattern is generated. The reproduction light generated from this recording medium 11 has the same polarized light as the reference light for reproduction, a source of the generation.

The reference light for reproduction enters the recording medium 11 in the state of circular polarized light from the foregoing light path of the light for recording. Therefore, the reproduction light has the circular polarized light. This reproduction light is changed into a bundle of parallel rays by the objective lens 40, and modulated into linearly polarized light by the one fourth wavelength plate 38 (its plane of polarization is perpendicular to that of the linearly polarized light of the incident reference light for reproduction). After that, the reproduction light is reflected by the half reflection plane 37 of the dichroic mirror 36, passes through the pair of relay lenses 36b and 36a, is reflected by the half reflection plane 27 of the polarizing beam splitter 26, is received by the photodetector 42, and is reproduced.

Meanwhile, in servo reading, light for servo which exits from the device for servo reading 32 is changed into approximately parallel rays by the second collimator lens 34, passes through the dichroic mirror 36, and passes the one fourth wavelength plate 38. Then, the recording medium 11 is illuminated with the light for servo by the objective lens 40.

The light for servo is reflected by the reflection layer 15 of this recording medium 11. This reflected light for servo with information of embossed pit tracks back the same light path and enters the device for servo reading 32. The photodetector of the device for servo reading 32 can comprehend position information of the recording medium 11 from the accepted light. Further, it is also possible to detect relative inclination between the light for recording/light for reproduction and the recording medium 11 by this servo reading.

In this embodiment, the first collimator lens 24 which changes laser light from the light source for recording and reproduction 22 which emits the light for recording in information recording and emits the reference light for reproduction in information reproduction, into a bundle of approximately parallel rays is reciprocated from side to side by the drive means 44. This drive means 44 moves the first collimator lens 24 by performing feedback control corresponding to the position information of the recording medium 11 which is detected by the light for servo which exits from the device for servo reading 32, is reflected by the reflection layer 15 of the recording medium 11, tracks back the same light path while carrying the information of the embossed pit, and enters the device for servo reading 32.

Figure 2:
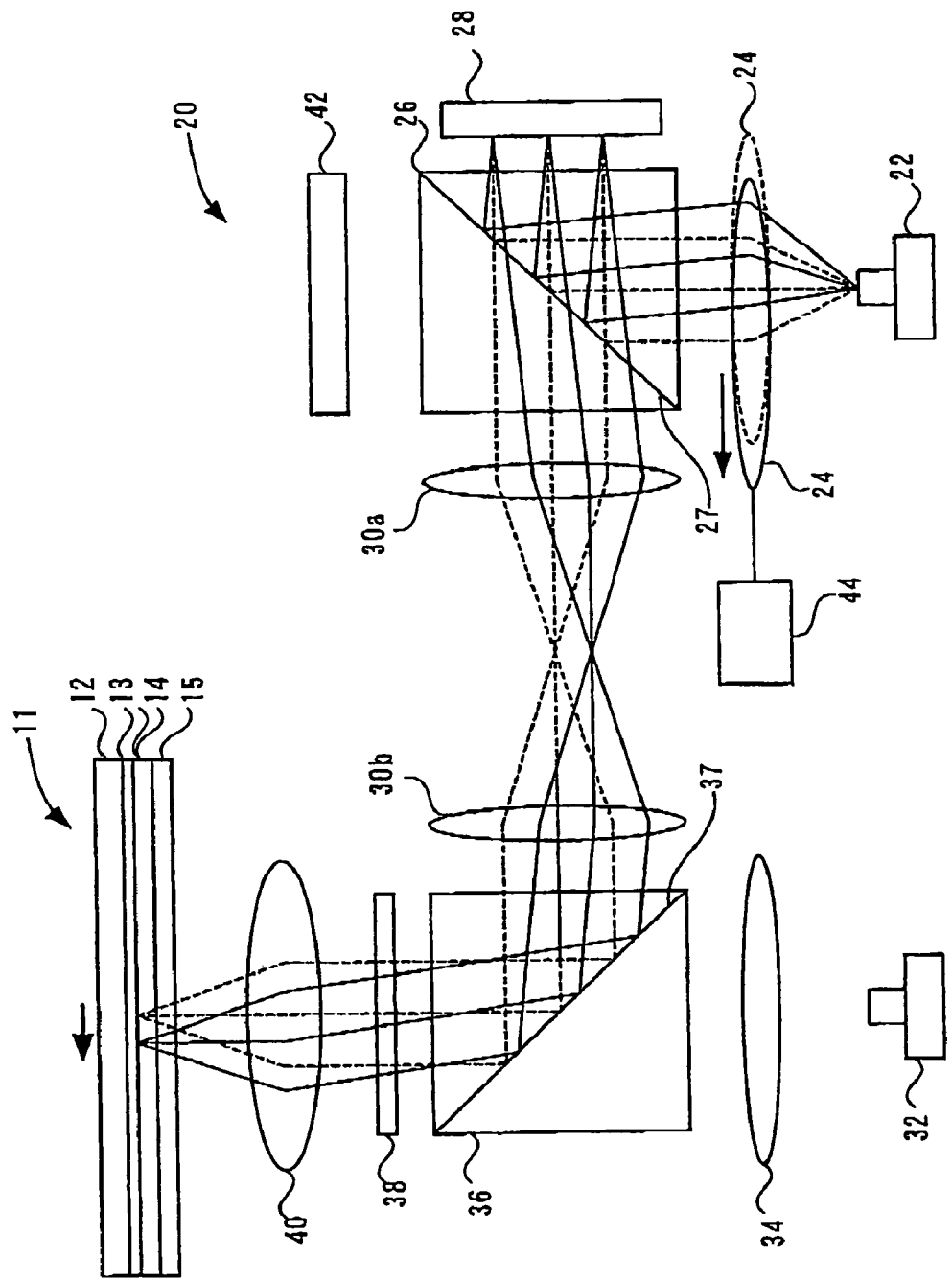
FIG. 2 is a drawing similar to FIG. 1 showing a change of light paths of FIG. 1.

FIG. 2 shows dotted lines, which are light paths when the first collimator lens 24 shown in a full line in FIG. 1 is in the central position in the horizontal direction.

Meanwhile, in FIG. 2, full lines show light paths when the first collimator lens 24 is moved from the central position to the left side in the horizontal direction by the drive means 44 corresponding to the position information of the recording medium 11, which is detected by the light for servo.

As shown in FIG. 2, when the first collimator lens 24 is moved from the central position shown in a dotted line to the left side shown in a full line, an angle of approach shown in a full line in relation to the half reflection plane 27 of the polarizing beam splitter 26 is different from a corresponding angle shown in a dotted line, though laser light exiting from the light source for recording and reproduction 22 is changed into approximately parallel rays when the laser light passes the first collimator lens 24. Therefore, an angle of approach in relation to the spatial light modulator 28 and an exit angle from this spatial light modulator 28 respectively shown in full lines are also different from corresponding angles shown in dotted lines. In result, an image formation position between the both relay lenses 30a and 30b and an angle of approach in relation to the half reflection plane 37 of the dichroic mirror 36 respectively shown in full lines become different those shown in dotted lines. Consequently, when information is recorded in the information recording layer 13 of the recording medium 11, information is recorded in a position shown in a full line differently from a position shown in a dotted line. The recording position on the recording medium 11 shown in a full line is a normal position where information should be recorded according to rotational motion of the recording medium 1.

When the reference light for reproduction exits from the light source for recording and reproduction 22 when information is reproduced, its light paths are changed as shown in full line in FIG. 2. Therefore, record can be reproduced from the normal position on the recording medium 11.

As described above, according to this embodiment, even when the laser light having small energy such as semiconductor laser light exits from the light source for recording and reproduction 22, it is possible to record information in the normal position of the recording medium 11 and reproduce information from the normal position of the recording medium 11, correspondingly to the position information of the recording medium 11, which is detected by the device for servo reading 32.

Further, the first collimator lens 24, which is far estranged from the recording medium 11 is moved. Therefore, an illumination position of the laser light in relation to the recording medium 11 by the objective lens 40 can be changed by gradually amplifying a fine moving distance of the first collimator lens 24 by the drive means 44. Consequently, slightly moving the first collimator lens 24 by the drive means 44 enables information recording into the normal position of the recording medium 11 and information reproduction from the normal position of the recording medium 11 according to movement of the recording medium 11.

The invention is not limited to the foregoing embodiment. Various changes may be made if necessary.

As described above, according to the invention, even when light having small energy is used for the hologram, information can be recorded and reproduced successfully.

That is, in the invention, the drive means to move the collimator lens according to movement of the recording medium is provided, and the angle of the light for recording which enters the polarizing beam splitter from the collimator lens is changed. Therefore, information can be recorded in the normal position on the recording medium according to movement of the recording medium by shifting a position of the light entering the recording medium.

Further, the drive means moves the collimator lens in the same plane. Therefore, information can be recorded in the normal position on the recording medium according to movement of the recording medium by only simply moving the collimator lens in the same plane.

Further, the drive means to move the collimator lens according to movement of the recording medium is provided, and the angle of the reference light for reproduction which enters the polarizing beam splitter from the collimator lens is changed. Therefore, information can be reproduced from the normal position on the recording medium according to movement of the recording medium by shifting a position of the light entering the recording medium.

Further, the drive means moves the collimator lens in the same plane. Therefore, information can be reproduced from the normal position on the recording medium according to movement of the recording medium by only simply moving the collimator lens in the same plane.

What is claimed is:

1. An optical information recording apparatus utilizing holography, the apparatus comprising:
   a light source for recording,
   a modulation means to modulate a light from said light source for generating, an information light carrying information,
   a holographic recording medium in which the information is recorded in motion to an orientation, and
   an angle change means for changing an angle of approach to said modulation means of the light from said light source so as to follow said orientation.

2. An optical information recording apparatus according to claim 1, said modulation means is a spatial light modulator.

3. An optical information recording apparatus according to claim 1, said angle change means moves a collimator lens.

4. An optical information recording apparatus according to claim 3, said movement of said collimator lens is in the plane of the collimator lens.

5. An optical information recording apparatus according to claim 1, the apparatus further comprising:
   a light source to generate light for servo,
   wherein the light for servo is irradiated to said holographic recording medium without passing said angle change means.

6. An optical information reproducing apparatus utilizing holography, the apparatus comprising:
   a light source for recording,
   a modulation means to modulate a light from said light source for generating a reference light for reproducing
   a holographic recording medium in which an information is recorded in motion to an orientation, and
   an angle change means for changing an angle of approach to said modulation means of the light from said light source so as to follow said orientation.

7. An optical information reproducing apparatus according to claim 6, said modulation means is a spatial light modulator.

8. An optical information reproducing apparatus according to claim 6, said angle change means moves a collimator lens.

9. An optical information reproducing apparatus according to claim 8, said movement of said collimator lens is in the plane of the collimator lens.

10. An optical information reproducing apparatus according to claim 6, the apparatus further comprising:
    a light source to generate light for servo,
    wherein the light for servo is irradiated to said holographic recording medium without passing said angle change means.

* * * * *